United States Patent [19]

Rozanc

[11] Patent Number: 4,564,315
[45] Date of Patent: Jan. 14, 1986

[54] METHOD FOR ANCHORING A BOLT IN A ROCK-LIKE STRUCTURE

[76] Inventor: Richard C. Rozanc, R.D. No. 3, McDonald, Pa. 15057

[21] Appl. No.: 510,580

[22] Filed: Jul. 5, 1983

[51] Int. Cl.⁴ .......................................... E21D 20/02
[52] U.S. Cl. .................................. 405/261; 405/260
[58] Field of Search ............... 405/259, 260, 261, 262

[56] References Cited

U.S. PATENT DOCUMENTS

| | | | |
|---|---|---|---|
| Re. 25,869 | 10/1965 | Schuermann et al. | 405/261 |
| 3,940,941 | 3/1976 | Libert et al. | 405/261 |
| 3,973,409 | 8/1976 | Asayama | 405/260 |
| 4,162,133 | 7/1979 | Clark et al. | 405/258 |
| 4,299,515 | 11/1981 | Yates et al. | 405/259 |
| 4,303,354 | 12/1981 | McDowell | 405/261 |
| 4,313,697 | 2/1982 | Rozanc | 405/261 |

Primary Examiner—David H. Corbin
Attorney, Agent, or Firm—Parmelee, Miller, Welsh & Kratz

[57] ABSTRACT

A method for anchoring a bolt, having a helical channel adjacent the end thereof, in a bore hole in a rock-like structure, especially in anchoring of mine roof bolts, wherein a resin package is first inserted into the bore hole and the bolt is inserted and rotated in a direction opposite the direction of the helical channel to fragment the resin package and mix the resin, and prior to complete hardening of the resin, but after substantial hardening thereof, the bolt is rotated in the opposite direction while the resin completely hardens to anchor the bolt in the rock-like structure.

5 Claims, 4 Drawing Figures

METHOD FOR ANCHORING A BOLT IN A ROCK-LIKE STRUCTURE

The present invention relates to a method for anchoring a bolt in a rock-like structure by the use of a resin, the bolt not requiring any additional mechanical anchoring and being anchored under tension. The invention is especially suited to resin anchoring of a mine roof bolt in rock strata to support and reinforce a mine roof.

It is common in mining, such as in coal mining, to reinforce the roof of the mine so as to prevent roof falls. Generally, the roof is reinforced by the means of roof support plates that are held flush with the roof by the means of anchored roof bolts or reinforcing rods that are anchored in bore holes drilled into the roof structure. The anchoring of the roof bolts is effected by the use of a mechanical expansion anchoring system, a resin system, or both.

The use of a resin system is preferable due to the economy of manufacturing of the requisite parts of the system and also the ease of installation. Such resin systems have previously used bolts that generally comprise a concrete reinforcing bar (rebar) having a flange at one end, the bar inserted into the bore hole and anchored by a hardenable resin. The resin system used is usually a polyester-type resin, or an epoxy-type resin, and a catalyst or hardening agent therefor, with such resin systems completely hardening, upon mixing, sometimes in under a minute. These resin systems are well known and commercially available.

As examples of resin-type systems which also use mechanical anchoring, reference is made to U.S. Pat. Nos. 4,162,133 and 4,299,519, wherein an expansion type anchor is used, with the combination rotated together clockwise into a bore hole to break a resin package, and the rotation is then reversed so that the anchor becomes stationary and is expanded by the bolt. In U.S. Pat. No. 3,973,409, an anchor is described where an auger is rotated in a first direction to drill a first bore hole, extendable blades are used to drill a larger hole, and the blades retracted by reversing the direction of rotation and removal from the hole to leave a pocket into which the end of an anchor is embedded within a bulb-shaped mortar filler. In U.S. Pat. No. 3,940,941, a discontinuous thread is provided on a bolt and the bolt is rotated counterclockwise to mix a resin, the bolt and a nut rotating in unison until the adhesive sets. After setting of the adhesive, the nut is rotated clockwise, while the bolt is stationary, to advance a washer against the roof structure and then impart a desired tension to the bolt. In U.S. Pat. No. 4,303,354, use of a trapped nut is disclosed, with the bolt and nut rotated together in one direction to mix an adhesive and, after the adhesive is set and the bolt is stationary, the nut only is rotated in the opposite direction to pull a plate against the mine roof.

In my earlier patent, U.S. Pat. No. 4,313,697, a mine roof support plate bolt has a counterclockwise helical channel adjacent one end thereof which communicates with a groove in the end. The resin is introduced as a package into the bore hole and the bolt rotated clockwise while torque is applied. The package is shredded and the resin mixed, while the helical channel restrains downward flow of resin and urges the resin upwardly towards the end of the bore hole, assuring good adhesive contact between the section of the bolt, adjacent the end of the bolt, and the wall of the bore hole. The adhesive then sets to anchor the bolt and thus support the roof.

SUMMARY OF THE INVENTION

A bolt having a helical channel adjacent the end thereof is anchored in a rock-like structure, solely by the use of resin material and without mechanical anchors, by inserting the bolt in a bore hole, drilled in the structure, behind a resin package, rotating the bolt in a direction opposite the direction of the helical channel in the bolt to fragment the resin package, mix the resin, and prior to complete hardening of the resin, but after substantial hardening thereof, rotating the bolt in the opposite direction, that is, in the direction of the helical channel, while the resin completely hardens to anchor the bolt in the rock-like structure.

BRIEF DESCRIPTION OF THE DRAWINGS

In the drawing, which schematically illustrates the present method for anchoring a mine roof bolt.

DETAILED DESCRIPTION

In the present method, a bolt having a helical channel at one end thereof is anchored in a bore hole in a rock-like structure using only a settable resin and without mechanical anchoring means. The helical channel of the bolt, in the nature of a screw thread, is adjacent the end of the bolt opposite a head on the bolt, and the helical channel can have either a counterclockwise thread or clockwise thread. The preferred use of the present method is in anchoring mine roof bolts in a mine roof rock strata to reinforce and support the roof. The method is also usable, however, to anchor a bolt in other rock-like structures such as concrete.

Figure 1:
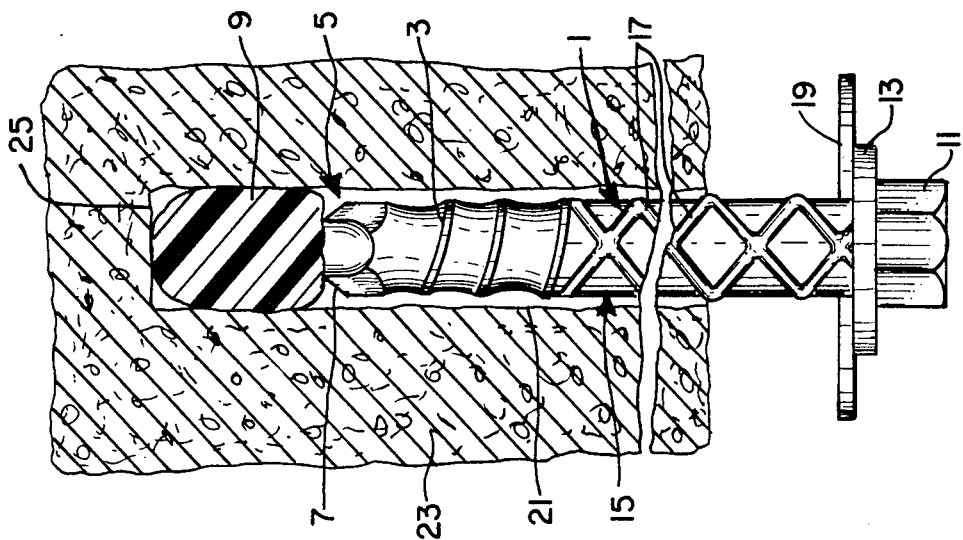
FIG. 1 schematically illustrates a bolt, with a counterclockwise helical channel, inserted into a bore hole pushing a resin package.

Referring to FIG. 1, there is illustrated a mine roof support bolt 1, having a counterclockwise helical channel 3, adjacent an end 5 which is preferably notched to provide teeth 7 for shredding a resin package 9. The bolt has, at the opposite end, a head 11, preferably having a flange 13, and the intermediate section of the bolt 15 has rebar ridges 17. A support plate 19 has an aperture through which the end 5 of the bolt 1 will pass and will be supported by the flange 13 of the bolt 1.

In the present method, a bore hole 21 is first drilled in the rock strata, such as a mine roof strata 23, and a resin package and bolt positioned for insertion into the open end bore hole 21. In FIG. 1, the resin package 9, which is a frangible package, is shown inserted adjacent the closed end 25 of the bore hole 21 and the bolt 1 is also inserted into the open end bore hole 21 supporting the resin package. The bolt 1 with its counterclockwise helical channel 3, is then rotated upwardly and torque applied in a clockwise direction so as to break the frangible resin package and mix the settable resin, thus initiating hardening of the resin.

Figure 2:
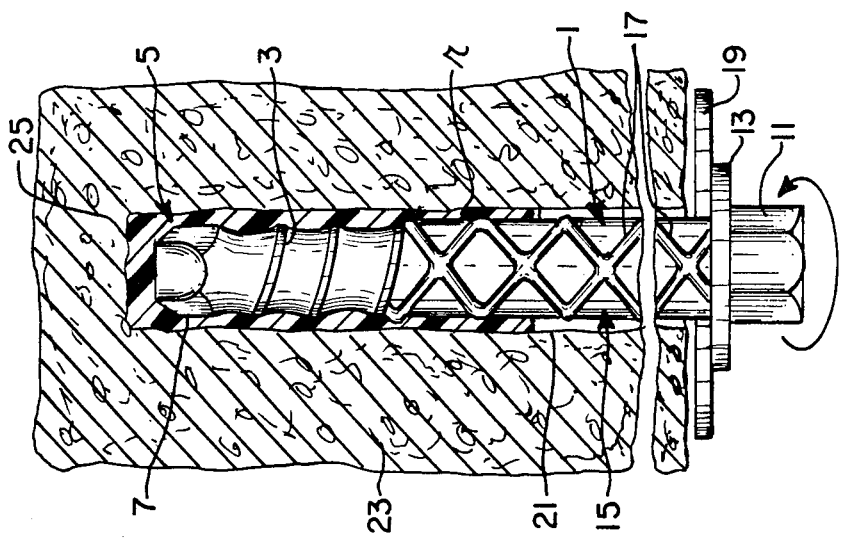
FIG. 2 schematically illustrates the bolt, with its counterclockwise helical channel, being rotated in a clockwise direction to shred and mix the resin package and contents and initiate setting of the resin.

As the resin package is broken, the resin r is mixed and, being liquefied, will tend to run out of the bore hole 21 between the wall of the hole and the bolt. The counterclockwise helical channel 3, with the bolt rotated in a clockwise direction, will overcome the tendency of the resin r to run down and will pump the resin r upwardly towards the closed end 25 of the bore hole 1. As the bolt is raised towards the closed end of the bore hole 1, the quick-setting resin r will begin to harden. The position of the bolt 1 in the bore hole 21 is illustrated in FIG. 2, after the resin r has been mixed and hardening initiated.

Figure 3:
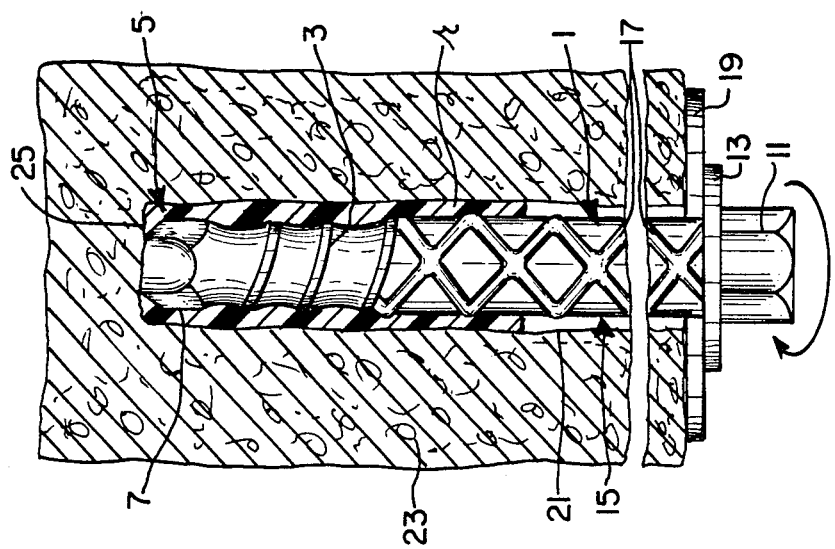
FIG. 3 schematically illustrates the bolt, with its counterclockwise helical channel, after substantial hardening of the resin, being rotated counterclockwise to pull the plate flush with the roof.

After the resin r has substantially hardened, but prior to complete hardening of the resin, as illustrated in FIG. 3, the rotation of the bolt is reversed, i.e., the bolt is rotated counterclockwise or in the direction of the thread of the helical channel, while the resin completely hardens, and the support plate 19 is pulled flush with the mine roof by the flange 13 and head 11 of the bolt 1. The rotation of the bolt is then stopped and the bolt will be retained, by anchoring of the resin r, under tension within the bore hole of the rock strata.

Figure 4:
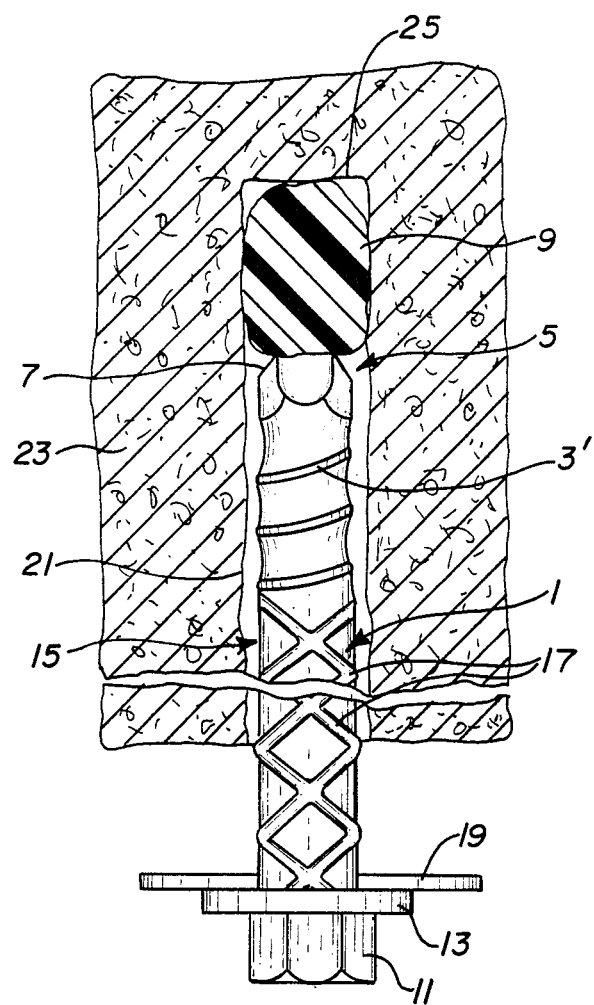
FIG. 4 schematically illustrates a bolt with a clockwise helical channel.

In instances where the bolt 1 has a clockwise helical channel 3' (FIG. 4.) adjacent the end thereof, the present method is practiced by first rotating the bolt in a counterclockwise direction to break the resin package, mix the resin and initiate hardening, and before complete hardening of the resin, but after substantial hardening thereof, the bolt is rotated in the opposite direction, i.e., clockwise, or in the direction of the thread of the helical channel, while the resin hardens completely.

The term "substantial hardening" as used herein to designate when the rotation of the bolt is to be reversed, defines a degree of hardness of the resin which provides sufficient structural integrity or viscosity such that the continued rotation of the bolt, in the direction of initial rotation, will tend to cause the bolt to back up due to the action of the channel on the hardenable resin. At this degree of hardening, the resin is structurally sound enough to accept the bolt, upon reverse of rotation of the bolt, as the bolt threads its way into the resin to pull the plate flush with the roof. At the point of substantial hardening, the resin will support the bolt and prevent slippage of the bolt from the bore hole and will accept the bolt, as by threading, when the bolt is rotated in the direction of the thread of the helical channel. The degree of hardening of a particular resin which would be defined by substantial hardening may vary depending on the type of resin and hardening catalyst used.

The substantial hardening of a particular resin may be ascertained, for example, by timing the setting of a particular resin and rotating the bolt in the first direction for a predetermined period of time and then reversing the rotation of the bolt for the short final hardening time period. In other instances, the viscosity increase of the hardening resin may be used to determine substantial hardening, where the bolt would be rotated in the first direction until the increase in viscosity of the resin reduces the velocity of rotation of the bolt, under a set torque, to a velocity of about one-third of less or the initial velocity, at which time the bolt is rotated in the opposite direction.

Resins which are usable are those polyester, epoxy, or other known resins available commercially which, upon mixing with a catalyst or activator, will completely harden in a matter of less than a minute, or a few minutes maximum. For example, resin sold under the trademark Stiquik by SII Mining Tools, which is known to completely harden in about 14 seconds, has been used wherein the bolt was rotated in a direction opposite the direction of the thread of the helical channel of a bolt for about 13 seconds whereupon substantial hardening of the resin was effected, and the bolt was then rotated in the opposite direction, i.e., in the direction of the thread of the helical channel for 1 second and the resin completely hardened to retain the bolt under tension, with the support plate flush against the mine roof. In another example, a bolt having a counterclockwise helical channel was used with Stiquik resin and the bolt rotated in a direction opposite the direction of the thread of the helical channel to fragment and mix the resin at a speed of 500 revolutions per minute. As the viscosity of the resin increased due to hardening thereof, the rotation of the bolt slowed to a rotation speed of 180 revolutions per minute, at which time the rotation of the bolt was reversed. The bolt was then rotated in the opposite direction, i.e., in the direction of the helical channel to pull the same flush with the roof plate.

In both of the previous instances, the anchored bolt showed excellent results in a pulling test to determine the degree of hold on the bolt.

In addition to use of the present method for reinforcing mine roofs, the method is also usable in anchoring of bolts in other rock-like structures such as concrete structures. The method may be used, for example, to affix bridge trusses, or the like, to a concrete support by drilling of a bore hole in the concrete support and affixing the truss to the support by use of a bolt anchored by the present method.

What is claimed is:

1. In a method of anchoring a bolt in a bore hole, having an open end and a closed end, formed in a rock-like structure, wherein the bolt is anchored solely by a resin material, under tension with a flange on the bolt at the open end of the bore hole, the improvement comprising:

inserting into the open end of the bore hole a supply of mixable resin material in a frangible container;

inserting a reinforcing bolt, without mechanical anchoring means, into the open end of said bore hole, which bolt has a helical channel therein adjacent the end so inserted and a flange at the other end thereof, to move the frangible container towards the closed end of the bore hole;

rotating the reinforcing bolt in a first direction, opposite the direction of the thread of the helical channel of the bolt, to fragment the container and mix the resin, and pump the resin towards the closed end of the bore hole, whereby the resin initiates hardening; and prior to complete hardening of the resin but after substantial hardening thereof, rotating the reinforcing bolt in the reverse direction, while the resin completely hardens, to anchor the bolt.

2. The method as defined in claim 1 wherein said bolt is rotated in the first direction until the hardening of the resin decreases the velocity of rotation to about one-third the initial velocity of rotation, and the bolt is then rotated in the reverse direction.

3. The method as defined in claim 1 wherein said helical channel has a counterclockwise thread.

4. The method as defined in claim 1 wherein said helical channel has a clockwise thread.

5. In a method of anchoring a reinforcing bolt in a bore hole, having an open and a closed end, formed in a mine roof rock strata, wherein the bolt is anchored solely by a resin material, under tension with support means flush with the mine roof at the open end of the bore hole, the improvement comprising:

inserting into the open end of the bore hole a supply of mixible resin material in a frangible container;

inserting a reinforcing bolt, without mechanical anchoring means, into the open end of said bore hole, which bolt has a helical channel therein adjacent the end so inserted and a flange at the other end thereof, to move the frangible container towards the closed end of the bore hole;

rotating the reinforcing bolt in a first direction, opposite the direction of the thread of the helical channel of the bolt, to fragment the container and mix the resin, and pump the resin towards the closed end of the bore hole, wherein the resin initiates hardening; and prior to complete hardening of the resin but after substantial hardening thereof, rotating the reinforcing bolt in the reverse direction, while the resin completely hardens, to anchor the reinforcing bolt under tension with the mine roof.

* * * * *